United States Patent
Huang

(10) Patent No.: US 10,502,256 B2
(45) Date of Patent: Dec. 10, 2019

(54) SUCTION CUP AND VACUUM SUCTION CUP HAVING SAME

(71) Applicant: ANHO HOUSEWARE CO., LTD. JIANGMEN, Jiangmen, Guangdong (CN)

(72) Inventor: Jianming Huang, Guangdong (CN)

(73) Assignee: ANHO HOUSEWARE CO., LTD. JIANGMEN, Jiangmen, Guangdong (CN)

( * ) Notice: Subject to any disclaimer, the term of this patent is extended or adjusted under 35 U.S.C. 154(b) by 0 days.

(21) Appl. No.: 15/779,072

(22) PCT Filed: Nov. 26, 2015

(86) PCT No.: PCT/CN2015/095667
§ 371 (c)(1),
(2) Date: May 24, 2018

(87) PCT Pub. No.: WO2017/088142
PCT Pub. Date: Jun. 1, 2017

(65) Prior Publication Data
US 2018/0355905 A1    Dec. 13, 2018

(51) Int. Cl.
*F16B 47/00*    (2006.01)
(52) U.S. Cl.
CPC .................................... *F16B 47/00* (2013.01)
(58) Field of Classification Search
CPC ...................................................... F16B 47/00
See application file for complete search history.

(56) References Cited

U.S. PATENT DOCUMENTS 7,690,609 B2 *  4/2010  Akai .................... F16B 47/00
                                                    248/205.5
8,128,042 B1    3/2012  Chen
(Continued)

FOREIGN PATENT DOCUMENTS

CN         102384150 A       3/2012
CN         203257856 U      10/2013
(Continued)

OTHER PUBLICATIONS

First Examination Report dated Oct. 2, 2018 for New Zealand patent application No. 725903, 4 pages.
(Continued)

*Primary Examiner* — Amy J. Sterling
(74) *Attorney, Agent, or Firm* — Yue (Robert) Xu; Apex Attorneys at Law, LLP

(57) ABSTRACT

Provided are a suction cup and a vacuum suction cup having the same. The suction cup includes a suction cup body including a connection part at an external side thereof, and a suction surface at an internal side thereof. The suction cup body includes a soft rubber layer and a hard rubber layer. The soft and hard rubber layers together form the suction surface of the suction cup body. The soft rubber layer has hardness less than that of the hard rubber layer. In a sucking state, the hard rubber layer can provide favorable supporting strength, and the soft rubber layer readily deforms by a suction pressure to fill a supporting surface, facilitating to seal the supporting surface tightly. The soft and hard rubber layers enhance a suction capacity of the suction cup body on an uneven surface, expanding a scope of an application of the vacuum suction cup.

14 Claims, 8 Drawing Sheets

(56) References Cited

U.S. PATENT DOCUMENTS

| | | |
|---|---|---|
| 9,091,294 B2 | 7/2015 | Zhang |
| 2005/0236538 A1 | 10/2005 | Schmidt |
| 2012/0085879 A1 | 4/2012 | Hao |
| 2014/0306083 A1 | 10/2014 | Zhang |

FOREIGN PATENT DOCUMENTS

| | | |
|---|---|---|
| CN | 203770358 U | 8/2014 |
| CN | 204646963 U | 9/2015 |
| DE | 202004020077 U1 | 5/2005 |
| JP | 2001208035 A | 8/2001 |
| WO | 2006138335 A3 | 5/2007 |
| WO | 2013055111 A1 | 4/2013 |

OTHER PUBLICATIONS

International Search Report for PCT/CN2015/095667 dated Aug. 31, 2016, ISA/CN.
The Indian First Office Action dated Apr. 26, 2019.
Search Report dated Jun. 13, 2019 for European patent application No. 15909053.9.

\* cited by examiner

SUCTION CUP AND VACUUM SUCTION CUP HAVING SAME

This application is a National Phase entry of PCT Application No. PCT/CN2015/095667, filed on Nov. 26, 2015, the entire disclosure of which is incorporated herein by reference.

FIELD

This application relates to the technical field of sucking immobilization, and particularly to a sucking disk and a vacuum sucker having the sucking disk.

BACKGROUND

A sucking disc device is a tool, which is sucked on an object by employing the difference between an internal pressure and an external atmospheric pressure, for hanging an article.

Currently, a vacuum sucker is a common sucking disc device which has been widely applied in industry and household. The vacuum sucker for household application is mainly to meet the demand of people for hanging houseware at any time. Since the vacuum sucker is detachable, it can be used for hanging towels, clothing and so on.

The vacuum sucker typically includes a sucking disc body and a slider pushing mechanism. The sucking disc body can be sucked on or detached from a wall or other support bodies by the slider pushing mechanism. The slider pushing mechanism is mainly in a form of a stepped ramp, and mainly includes a slider, a slider cover, a sucking disc cover and a pin shaft. The slider is provided with a stepped surface. A connecting end of the sucking disc is connected to the sucking disc cover through the pin shaft. The slider is slidably connected to the sucking disc cover, and the pin shaft is laterally provided on the stepped surface of the slider. The slider cover is covered on an upper surface of the slider.

The slider cover is pushed by a user to move reciprocally, which brings the slider to move. The stepped surface of the slider is moved with respect to the pin shaft, and in turn the pin shaft is moved upward or downward perpendicular to a sucking face. When the pin shaft is moved upward, a vacuum space is formed between the sucking disc body and the support body, thus the vacuum sucker is immobilized with respect to the support body. When the pin shaft is moved downward along the stepped surface, the sucking disc body gets close to the support body, and the vacuum space between the sucking disc body and the support body is released, and thus the sucking between the sucking disc body and the support body is released.

Currently, the sucking face of the sucking disc body in contact with the support body generally employs a hard rubber. Although the hard rubber has a relatively strong supporting capability, the sucking force between the sucking surface made of the hard rubber and the support body with an uneven surface is poor, thus, the application of the vacuum sucker on an uneven surface environment is limited.

Therefore, in view of the above issue, a technical issue to be addressed presently by those skilled in the art is to improve the structure of a vacuum sucker in the conventional technology, which can be applied onto an uneven surface environment.

SUMMARY

An object of the present application is to provide a vacuum sucker which can be reliably sucked on an uneven surface of a support body.

To achieve above object, a following technical solution is employed according to the present application.

A sucking disc, includes a sucking disc body. The sucking disc body has a connecting portion at an outer side and a sucking surface at an inner side. The sucking disc body includes a soft rubber layer and a hard rubber layer. The soft rubber layer and the hard rubber layer together form the sucking surface of the sucking disc body. The hardness of the soft rubber layer is lower than the hardness of the hard rubber layer.

Compared with a sucking surface formed of a single hard rubber or a sucking surface formed of a single soft rubber in the conventional technology, the sucking surface of the sucking disc body herein is formed of the soft rubber layer and the hard rubber layer together. The hard rubber layer can provide a better support strength required by the sucking disc body when bearing a load in a sucking state. The surface of the soft rubber layer is softer than the surface of the hard rubber layer, and when the sucking disc body is in the sucking state, the soft rubber layer is easily deformed under a suction pressure, thus the soft rubber layer can better follow a surface of a support body, which facilitates the sealing of the surface of the support body, increases the capacity of the sucking disc body for being sucked on the uneven surface, and facilitates the application of the vacuum sucker in an uneven surface environment, thereby expanding the application scope of the vacuum sucker.

Optionally, the soft rubber layer has an annular structure. A surface of the hard rubber layer is provided with a mounting groove for fitting the soft rubber layer, and an outer surface of the soft rubber layer is not lower than an outer surface of the hard rubber layer.

Optionally, the annular structure has a gradually increased thickness in a radial direction from outside to inside, from outside to inside.

Optionally, the mounting groove has a multi-stepped surface structure.

Optionally, the hard rubber layer and the soft rubber layer are formed by integral injection molding or press-molding.

Furthermore, a vacuum sucker is provided according to the present application, which includes a sucking disc, a sucking disc cover, a slider assembly, and an elastic component, a connecting portion of the sucking disc is positioned to the sucking disc cover by a mandrel, and the elastic component is provided between the sucking disc cover and the sucking disc, the slider assembly includes a slider having a stepped surface and a slider cover covered over the slider, characterized in that, the sucking disc is the sucking disc according to any one of the above descriptions.

Optionally, an outside surface of the sucking disc body has a circumferential projection extending rearward, and a corresponding side surface of the sucking disc cover has a groove for fitting the circumferential projection.

Optionally, an outer diameter of the outside surface of the sucking disc body is greater than an outer diameter of the circumferential projection. In the case that the sucking disc is mounted on the sucking disc cover, an edge portion of the sucking disc located outside the circumferential projection abuts against a corresponding surface of the sucking disc cover.

Optionally, an outside surface of the sucking disc cover is provided with two sliding rails, and the two sliding rails cooperate with the slider in sliding, and the outside surface of the sucking disc cover is provided with a boss. The two sliding rails are arranged on a surface of the boss.

Optionally, the outside surface of the sucking disc cover is further provided with a hanging slot. An opening of the hanging slot faces outward. When the vacuum sucker is in a non-sucking state, the slider is located above or below the hanging slot. When the vacuum sucker is in the sucking state, the slider is placed at the opening of the hanging slot.

BRIEF DESCRIPTION OF THE DRAWINGS

For more clearly illustrating embodiments of the present application or the technical solutions in the conventional technology, drawings referred to describe the embodiments or the conventional technology will be briefly described hereinafter. Apparently, the drawings in the following description are only some examples of the present application, and for those skilled in the art, other drawings may be obtained based on these drawings without any creative efforts.

Figure 1:
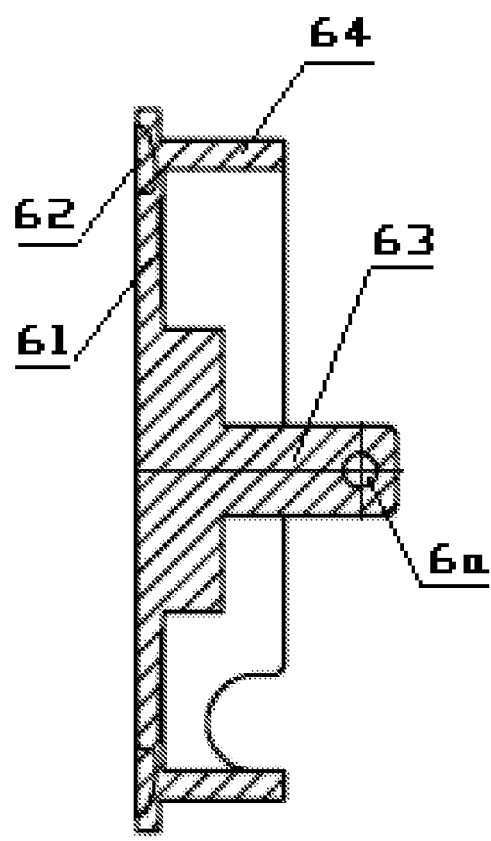
FIG. 1 is a schematic view showing the structure of a sucking disc herein.

Corresponding relationships between component names and reference numerals in FIGS. 1 to 12 are as follows:

| 1 | slider cover, | 2 | mandrel, |
|---|---|---|---|
| 3 | slider, | 4 | sucking disc cover, |
| 41 | boss, | 42 | sliding rail, |
| 43 | position-limiting block, | 4a | hanging slot, |
| 4b | groove, | 5 | elastic component, |
| 6 | sucking disc body, | 61 | hard rubber layer, |
| 62 | soft rubber layer, | 63 | mounting post, |
| 64 | circumferential projection, | 65 | edge portion, and |
| 6a | lateral through hole. | | |

DETAILED DESCRIPTION

In view of the technical issue present in the conventional technology that a vacuum sucker is sucked onto an uneven surface with a poor sucking force, an in-depth research is conducted herein. Through the research, it has been found that a sucking disc body in the conventional technology tends to employ a hard rubber to achieve the service strength and the service life of the sucking disc body. The hard rubber in a range of the hardness value is not easily deformed. When the hard rubber is in sucking contact with an uneven surface, it is different to form a sealed space between the hard rubber and the uneven surface, resulting in a relatively poor sucking force, thus the application of the vacuum sucker in an uneven surface environment is limited.

Based on the above research, the proposed technical solution herein, in which the service life and the strength of the sucking disc body are compromised and a strong sucking force in the uneven surface environment is achieved, is described in detail below.

For those skilled in the art to better understand the technical solutions of the present application, the technical solutions are further described in detail hereinafter in conjunction with the drawings and embodiments.

Figure 2:
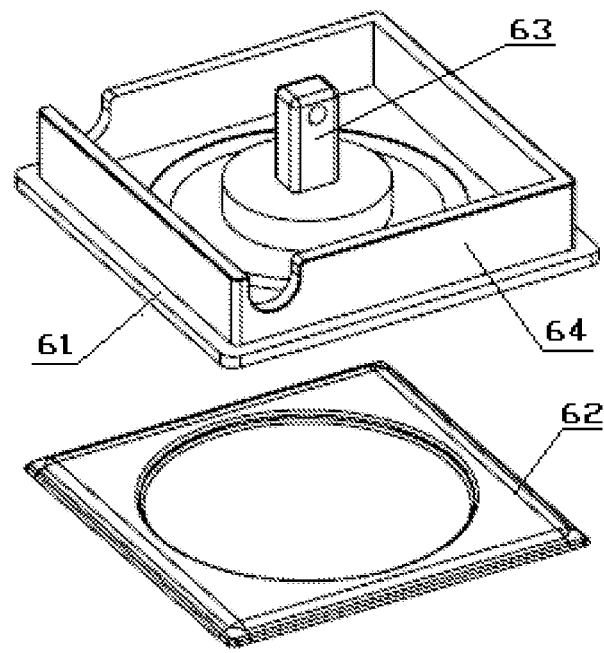
FIG. 2 is an exploded view of the sucking disc shown in FIG. 1.

Reference is made to FIGS. 1 to 2. FIG. 1 is a schematic view showing the structure of a sucking disc herein. FIG. 2 is an exploded view of the sucking disc shown in FIG. 1.

A sucking disc is provided according to the present application, which is mainly applied to a vacuum sucker. The sucking disc includes a sucking disc body 6. The sucking disc body 6 is provided with a connecting portion at an outer side, and the specific structure of the connecting portion will be specifically described below. The sucking disc body 6 has a sucking surface at an inner side. The sucking disc body 6 includes a soft rubber layer 62 and a hard rubber layer 61. The soft rubber layer 62 and the hard rubber layer 61 together form the sucking surface of the sucking disc body 6. The sucking surface described herein refers to a surface of the vacuum sucker in sucking contact with a support body. Reference may be made to the conventional technology for the material of the hard rubber layer 61 commonly used in the sucking disc. The hard rubber layer 61 herein may be a material forming the sucking surface of the sucking disc body 6 in the conventional technology. Accordingly, the hardness of the soft rubber layer 62 herein is lower than the hardness of the hard rubber layer 61 and an adhesion degree of the soft rubber layer 62 herein is higher than an adhesion degree of the hard rubber layer 61.

Compared with a sucking surface formed of a single hard rubber or a sucking surface formed of a single soft rubber in the conventional technology, the sucking surface of the sucking disc body 6 herein is formed of the soft rubber layer 62 and the hard rubber layer 61 together. The hard rubber layer 61 can provide a better support strength required by the sucking disc body 6 when bearing a load in the sucking state. The surface of the soft rubber layer 62 is softer than the surface of the hard rubber layer 61. When the sucking disc body 6 is in the sucking state, the soft rubber layer 62 is easily deformed under the action of the sucking pressure, thus the soft rubber layer 62 can better follow a surface of a support body, which facilitates the sealing of the surface of the support body, increases the sucking capacity of the sucking disc body 6 in the uneven surface environment, and facilitates the application of the vacuum sucker in the uneven surface environment, thereby expanding the application scope of the vacuum sucker.

Herein, the technical solution is further described by taking the sucking disc body 6 applied to the vacuum sucker as an example.

Figure 4:
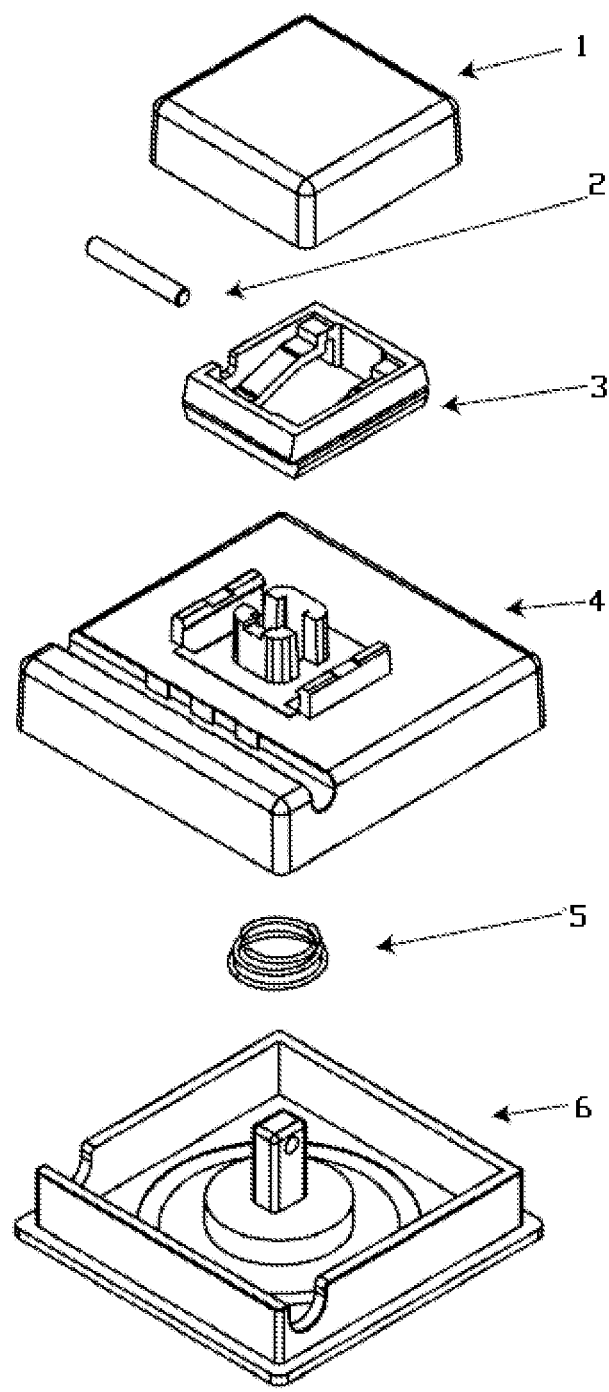

Reference is made to FIG. 4, which is an exploded view of the vacuum sucker. The vacuum sucker includes the sucking disc, a sucking disc cover 4, a slider assembly, and an elastic component 5. A connecting portion of the sucking disc is a mounting post 63 provided with a lateral through hole 6a, a mandrel 2 is provided in the lateral through hole 6a, and the mounting post 63 is positioned to the sucking disc cover 4 by the mandrel 2. Specifically, the sucking disc cover 4 is provided with two position-limiting blocks 43 to limit an upper position and a lower position, and the position of the mandrel 2 is limited between the two position-limiting blocks 43, and the mandrel 2 can be relatively moved in a front-rear direction. Further, the elastic component 5 is also provided between the sucking disc cover 4 and the sucking disc. The elastic component 5 may be a coil spring, which, apparently, may also be other forms of elastic component 5.

The slider assembly includes a slider 3 having a stepped surface and a slider cover 1 covered over the slider 3. The arrangement of the stepped surface may refer to FIG. 4, and the stepped surface has at least two steps for positioning the mandrel 2. When the mandrel 2 is positioned on the first step, the sucking disc body 6 is in a non-sucking state; and when the mandrel 2 is positioned on the second step, the sucking disc body 6 is in the sucking state.

Figure 5:
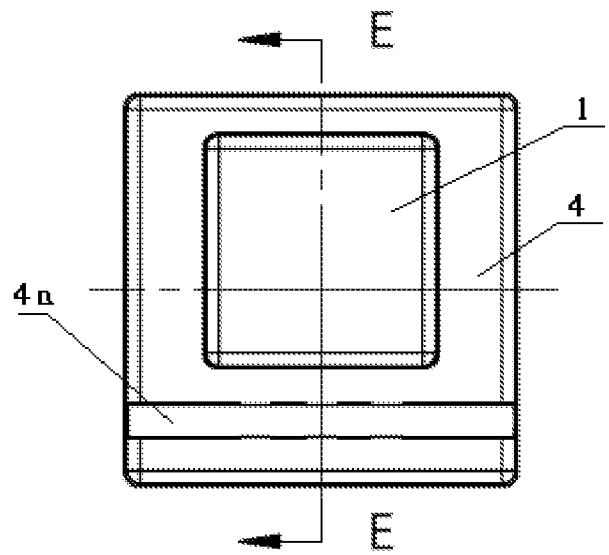
FIG. 5 is a schematic view of a vacuum sucker herein in a non-sucking state.
Figure 6:
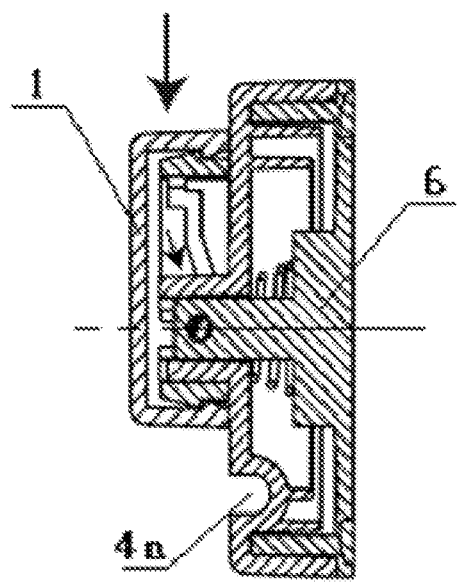
FIG. 6 is a schematic sectional view taken along E-E in FIG. 5.
Figure 7:
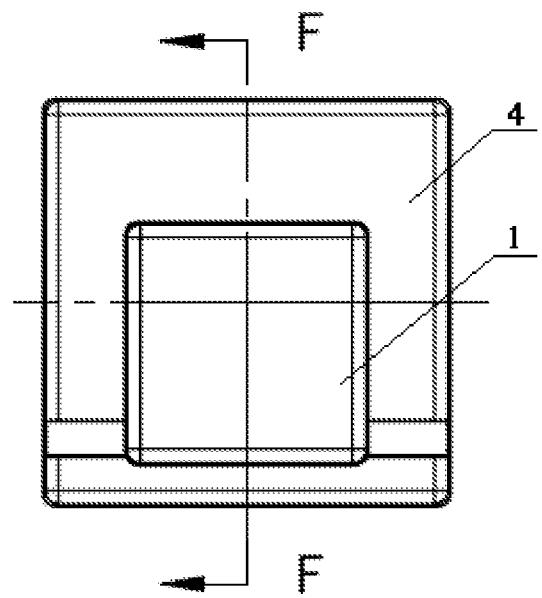
FIG. 7 is a schematic view of the vacuum sucker herein in a sucking state.
Figure 8:
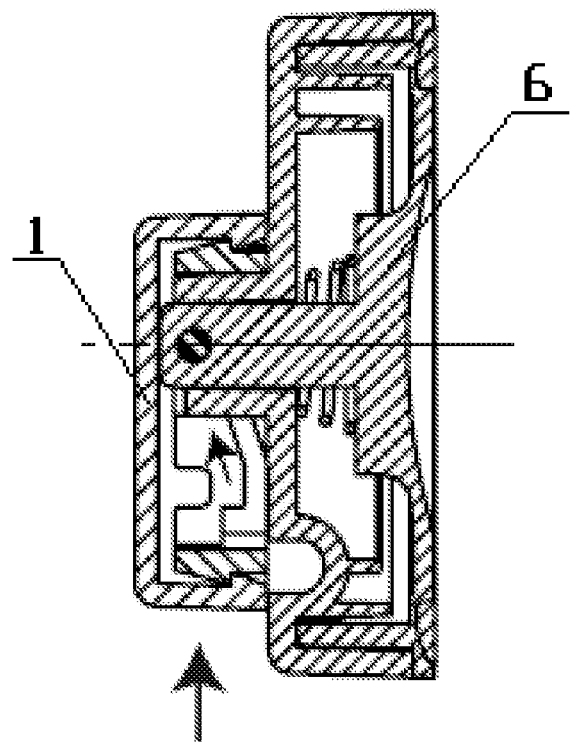
FIG. 8 is a schematic sectional view taken along F-F in FIG. 7.

Reference is made to FIGS. 5, 6 and 7, 8. FIG. 5 is a schematic view of a vacuum sucker herein being in the non-sucking state. FIG. 6 is a sectional schematic view taken along E-E in FIG. 5. FIG. 7 is a schematic view of the vacuum sucker herein in the sucking state. FIG. 8 is a sectional schematic view taken along F-F in FIG. 7. The specific operating process of the vacuum sucker herein is as follows.

FIGS. 5 and 6 are schematic views of the vacuum sucker in the non-sucking state. When it is required to suck the vacuum sucker on the surface of the support body, the slider cover 1 is pushed downward, and the slider 3 is also moved along with the slider cover 1, thus the slider 3 is moved downward. Since the stepped surface of the slider 3 in contact with the mandrel 2 is gradually raised from bottom to top, the mandrel 2 brings the sucking disc body 6 to gradually move to the left under the abutment action of the stepped surface. Since the periphery of the sucking disc body 6 abuts against the sucking disc cover 4, a central part of the sucking disc body 6 is deformed to form a vacuum space, thus the vacuum sucker is sucked on the surface of the support body.

Reference is made to FIGS. 7 and 8, when it is required to detach the vacuum sucker from the object, it simply need to push the slider cover 1 reversely to move the slider 3, and the mandrel 2 is moved from a high position to a low position of the stepped surface of the slider 3, meanwhile, the deformed portion at the central part of the sucking disc body 6 is recovered to an original position by the action of a restoring force of the elastic component 5, then the sucking disc body 6 is in the non-sucking state.

In the above embodiments, the soft rubber layer 62 of the sucking disc body 6 may be an annular structure, and the surface of the hard rubber layer 61 is provided with a mounting groove for fitting the soft rubber layer 62. Further, an outer surface of the soft rubber layer 62 is not lower than an outer surface of the hard rubber layer 61, that is to say, in the case that the soft rubber layer 62 is mounted to the hard rubber layer 63, the outer surfaces of the soft rubber layer 62 and the hard rubber layer 61 are located in a same plane or the outer surface of the soft rubber layer 62 is slightly higher than the outer surface of the hard rubber layer 61.

Thus, the soft rubber layer 62 is arranged uniformly in a circumferential direction of the sucking disc body 6. When the vacuum sucker is in the sucking state, the soft rubber layer 62 is deformed uniformly, which facilitates a sealing contact with the support body in the circumferential direction and improves the sucking reliability of the vacuum sucker.

It can be seen in the description of the sucking operating state of the above vacuum sucker that, the central part of the vacuum sucker has a relatively large deformation. Thus, the closer to the central part of the vacuum sucker a position is, the weaker the sealing of the sucking disc body 6 to a contacting surface of the support body is.

In view of this, a further improvement is made on the basis of the embodiments described above according to the present application.

Figure 3:
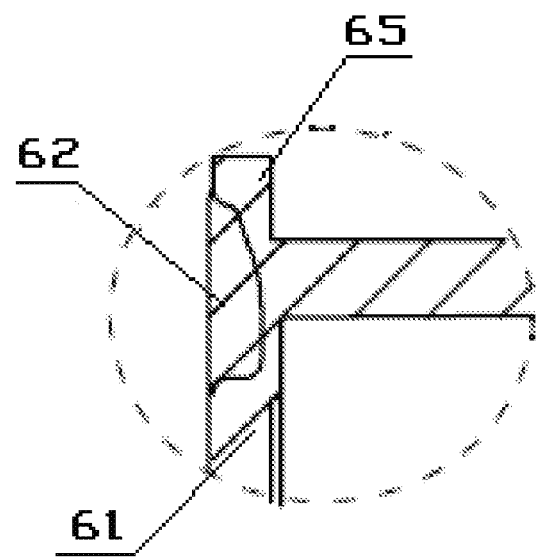
FIG. 3 is a partially enlarged view of a position at which a soft rubber layer is connected to a hard rubber layer.

Reference is made to FIG. 3, which is a partially enlarged view of a position at which the soft rubber layer is connected to the hard rubber layer.

In one particular embodiment, the thickness of the annular structure is gradually increased from outside to inside in a radial direction. It is to be noted that herein the center of the annular structure is defined as "in", correspondingly, another end to which a radius extends is defined as "out".

It should be noted that, the annular structure described herein may have the same shaped inner surface and outer surface, such as a circular shape, a square shape, etc. Apparently, the inner surface and the outer surface may also have different shapes. The schematic structural view, in which the inner surface is in a circular shape, and the outer surface is in a square shape, is illustrated herein.

The mounting of the soft rubber layer 62 to the hard rubber layer 61 may be implemented by various manners, for example, by injection molding or press molding. In order to improve the reliability of the soft rubber layer 62 and the hard rubber layer 61, the mounting groove on the surface of the hard rubber layer 61 can be designed as a multi-stepped surface structure, accordingly, the mounting portion of the soft rubber layer 62 may also be a multi-stepped surface. In this way, the soft rubber layer 62 and the hard rubber layer 61 are formed via the multi-stepped surfaces, thus the positioning reliability of the soft rubber layer 62 and the hard rubber layer 61 is increased.

When the vacuum sucker is in the sucking state, the central part of the sucking disc body 6 is deformed inward to form the vacuum space. In the conventional technology, the periphery of the sucking disc body 6 is generally immobilized to the sucking disc cover 4 by a pressing process. In the conventional technology, in the case that the vacuum sucker is used for a number of times, the sucking disc body 6 and the sucking disc cover 4 are apt to move with respect to each other at a pressing position. Therefore, on the basis of the above embodiments, the technical issue, in which the sucking disc body 6 and the sucking disc cover 4 move and deform with respect to each other, is further addressed herein.

Figure 9:
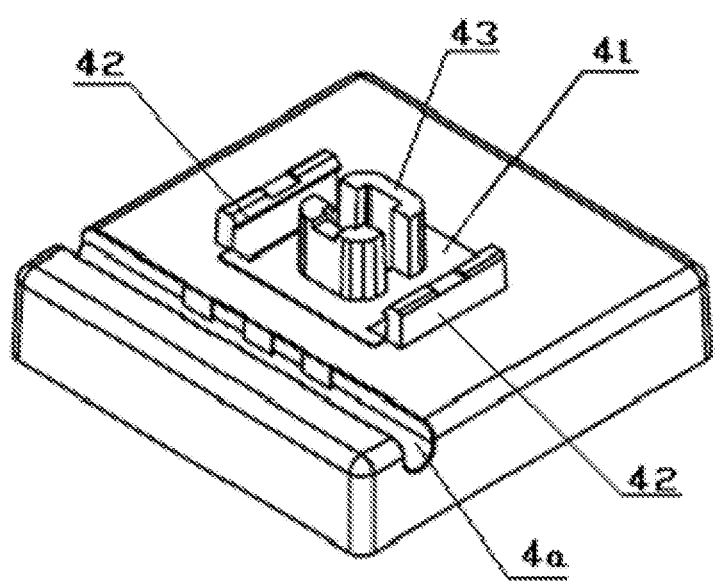
FIG. 9 is a schematic view showing the specific structure of a sucking disc cover herein.
Figure 10:
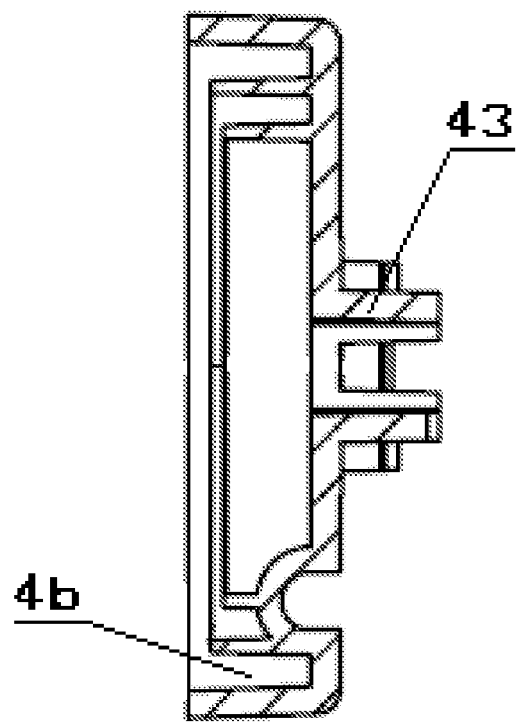
FIG. 10 is a sectional view of the sucking disc cover shown in FIG. 9.
Figure 11:
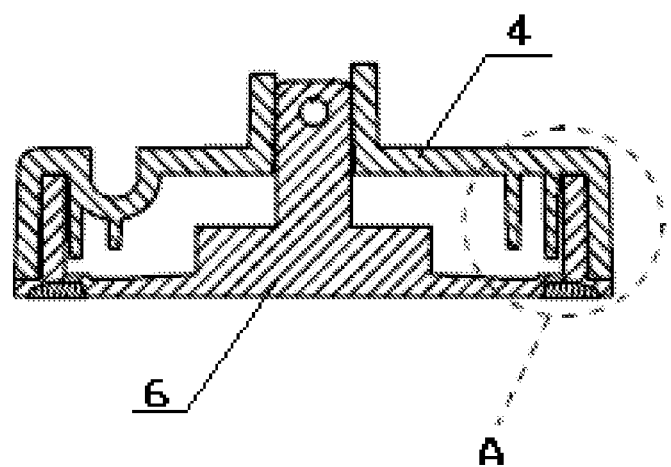
FIG. 11 is a schematic view showing the assembly of the sucking disc cover and the sucking disc.
Figure 12:
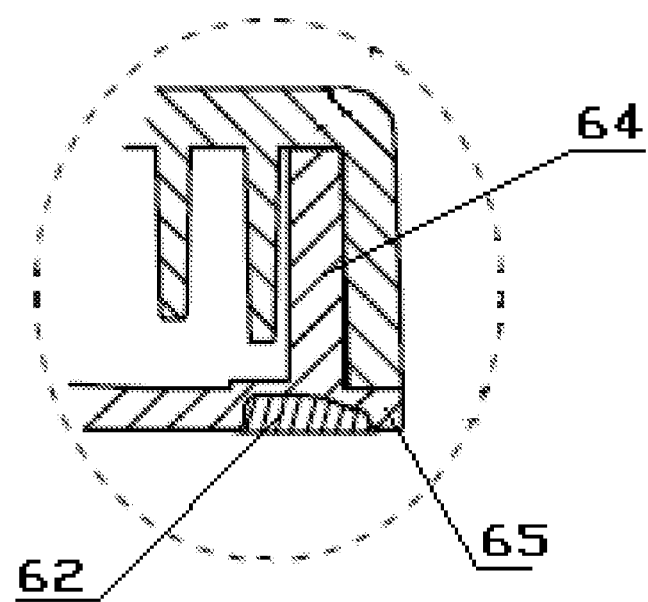
FIG. 12 is an enlarged view at position A in FIG. 11.

Specifically, reference is made to FIGS. 9, 10, 11, 12. FIG. 9 is a schematic view showing the specific structure of a sucking disc cover herein. FIG. 10 is a sectional view of the sucking disc cover shown in FIG. 9. FIG. 11 is a schematic view showing the assembly of the sucking disc cover and the sucking disc. FIG. 12 is an enlarged view at position A in FIG. 11.

In a preferred embodiment, an outside surface of the sucking disc body 6 has a circumferential projection 64 extending rearward, and a corresponding side surface of the sucking disc cover 4 has a groove 4b for fitting the circumferential projection 64. When the vacuum sucker is assembled, the circumferential projection of the sucking disc body 6 is mounted in the groove 4b. In this way, when the central part of the sucking disc body 6 is deformed, the groove 4b limits the circumferential projection 64 in a certain degree, thus preventing an outer edge of the sucking disc body 6 from moving inward.

Considering the issue of sealing in the case that the sucking disc and the sucking disc cover 4 are mounted together, the sucking disc may be further designed as follows. In the above embodiments, an outer diameter of the outside surface of the sucking disc body 6 is larger than an outer diameter of the circumferential projection 64. In the case that the sucking disc is assembled with the sucking disc cover 4, an edge portion 65 located outside the circumferential projection 64 abuts against a corresponding surface of the sucking disc cover 4. Thus, the sucking disc cover 4 and the sucking disc can form a reliable sealing structure.

Referring again to FIG. 9, an outside surface of the sucking disc cover 4 is provided with two sliding rails 42 for cooperating with the slider 3 in sliding, and the outside surface of the sucking disc cover 4 may be provided with a boss 41. The two sliding rails are arranged on a surface of the boss 41.

In this embodiment, when the slider 3 is moved back and forth, the slider 3 is in sliding contact with the boss 41, preventing the slider 3 from being in contact with the sucking disc cover 4, and reducing rubbing to the surface of the sucking disc cover 4, which facilitates holding a smooth surface of the sucking disc cover 4 in one aspect, and in another aspect, reduces the acting force for driving the slider 3 since the slider 3 is in partial contact with the boss 41, the contact area is relatively small, and the resistance during the sliding movement is relatively small.

In the above embodiments, the outside surface of the sucking disc cover 4 may be further provided with a hanging slot 4a, and the hanging slot is also provided with a fastener, an opening of the hanging slot 4a faces outward. When the vacuum sucker is in the non-sucking state, the slider 3 is located above or below the hanging slot 4a. When the vacuum sucker is in the sucking state, the slider 3 is placed at the opening of the hanging slot 4a.

Based on the above description of the disclosed embodiments, the person skilled in the art is capable of carrying out or using the present application. It is obvious for the person skilled in the art to make many modifications to these embodiments. The general principle defined herein may be applied to other embodiments without departing from the spirit or scope of the present application. Therefore, the present application is not limited to the embodiments illustrated herein, but should be defined by the broadest scope consistent with the principle and novel features disclosed herein.

What is claimed is:

1. A sucking disc, comprising a sucking disc body, wherein the sucking disc body has a connecting portion at an outer side and a sucking surface at an inner side, the sucking disc body comprises a soft rubber layer and a hard rubber layer, the soft rubber layer and the hard rubber layer together form the sucking surface of the sucking disc body, and the hardness of the soft rubber layer is lower than the hardness of the hard rubber layer;
wherein the soft rubber layer has an annular structure, a surface of the hard rubber layer is provided with a mounting groove for cooperating with the soft rubber layer, and an outer surface of the soft rubber layer is not lower than an outer surface of the hard rubber layer;
wherein the mounting groove has a multi-stepped surface structure.

2. The sucking disc according to claim 1, wherein the annular structure has a gradually increased thickness from outside to inside in a radial direction.

3. The sucking disc according to claim 1, wherein the hard rubber layer and the soft rubber layer are formed by integral injection molding or press-molding.

4. A vacuum sucker, comprising a sucking disc, a sucking disc cover, a slider assembly, and an elastic component, wherein
a connecting portion of the sucking disc is positioned to the sucking disc cover by a mandrel, and the elastic component is provided between the sucking disc cover and the sucking disc,
the slider assembly comprises a slider having a stepped surface and a slider cover covered over the slider, wherein
the sucking disc comprises a sucking disc body, the sucking disc body has a connecting portion at an outer side and a sucking surface at an inner side, the sucking disc body comprises a soft rubber layer and a hard rubber layer, the soft rubber layer and the hard rubber layer together form the sucking surface of the sucking disc body, and the hardness of the soft rubber layer is lower than the hardness of the hard rubber layer;
wherein the soft rubber layer has an annular structure, a surface of the hard rubber layer is provided with a mounting groove for cooperating with the soft rubber layer, and an outer surface of the soft rubber layer is not lower than an outer surface of the hard rubber layer.

5. The vacuum sucker according to claim 4, wherein an outside surface of the sucking disc body has a circumferential projection extending rearward, and a corresponding side surface of the sucking disc cover has a groove for fitting the circumferential projection.

6. The vacuum sucker according to claim 5, wherein an outer diameter of the outside surface of the sucking disc body is larger than an outer diameter of the circumferential projection, in the case that the sucking disc is assembled with the sucking disc cover, an edge portion of the sucking disc located outside the circumferential projection abuts against a corresponding surface of the sucking disc cover.

7. The vacuum sucker according to claim 4, wherein an outside surface of the sucking disc cover is provided with two sliding rails, and the two sliding railing cooperate with the slider in sliding, and the outside surface of the sucking disc cover is provided with a boss, the two sliding rails are arranged on a surface of the boss.

8. The vacuum sucker according to claim 4, wherein the outside surface of the sucking disc cover is further provided with a hanging slot, and an opening of the hanging slot faces outward, when the vacuum sucker is in a non-sucking state, the slider is located above or below the hanging slot, when the vacuum sucker is in an sucking state, the slider is placed at the opening of the hanging slot.

9. The sucking disc according to claim 1, wherein the hard rubber layer and the soft rubber layer are formed by integral injection molding or press-molding.

10. The sucking disc according to claim 2, wherein the hard rubber layer and the soft rubber layer are formed by integral injection molding or press-molding.

11. The sucking disc according to claim 1, wherein the hard rubber layer and the soft rubber layer are formed by integral injection molding or press-molding.

12. A vacuum sucker, comprising a sucking disc, a sucking disc cover, a slider assembly, and an elastic component, wherein
a connecting portion of the sucking disc is positioned to the sucking disc cover by a mandrel, and the elastic component is provided between the sucking disc cover and the sucking disc,
the slider assembly comprises a slider having a stepped surface and a slider cover covered over the slider, wherein the sucking disc comprises a sucking disc body, the sucking disc body has a connecting portion at an outer side and a sucking surface at an inner side, the sucking disc body comprises a soft rubber layer and a hard rubber layer, the soft rubber layer and the hard rubber layer together form the sucking surface of the sucking disc body, and the hardness of the soft rubber layer is lower than the hardness of the hard rubber layer;

wherein the soft rubber layer has an annular structure, a surface of the hard rubber layer is provided with a mounting groove for cooperating with the soft rubber layer, and an outer surface of the soft rubber layer is not lower than an outer surface of the hard rubber layer;

wherein the annular structure has a gradually increased thickness from outside to inside in a radial direction.

13. A vacuum sucker, comprising a sucking disc, a sucking disc cover, a slider assembly, and an elastic component, wherein a connecting portion of the sucking disc is positioned to the sucking disc cover by a mandrel, and the elastic component is provided between the sucking disc cover and the sucking disc, the slider assembly comprises a slider having a stepped surface and a slider cover covered over the slider, wherein the sucking disc comprises a sucking disc body, the sucking disc body has a connecting portion at an outer side and a sucking surface at an inner side, the sucking disc body comprises a soft rubber layer and a hard rubber layer, the soft rubber layer and the hard rubber layer together form the sucking surface of the sucking disc body, and the hardness of the soft rubber layer is lower than the hardness of the hard rubber layer;

wherein the soft rubber layer has an annular structure, a surface of the hard rubber layer is provided with a mounting groove for cooperating with the soft rubber layer, and an outer surface of the soft rubber layer is not lower than an outer surface of the hard rubber layer;

wherein the mounting groove has a multi-stepped surface structure.

14. A vacuum sucker, comprising a sucking disc, a sucking disc cover, a slider assembly, and an elastic component, wherein a connecting portion of the sucking disc is positioned to the sucking disc cover by a mandrel, and the elastic component is provided between the sucking disc cover and the sucking disc, the slider assembly comprises a slider having a stepped surface and a slider cover covered over the slider, wherein the sucking disc comprises a sucking disc body, the sucking disc body has a connecting portion at an outer side and a sucking surface at an inner side, the sucking disc body comprises a soft rubber layer and a hard rubber layer, the soft rubber layer and the hard rubber layer together form the sucking surface of the sucking disc body, and the hardness of the soft rubber layer is lower than the hardness of the hard rubber layer;

wherein the soft rubber layer has an annular structure, a surface of the hard rubber layer is provided with a mounting groove for cooperating with the soft rubber layer, and an outer surface of the soft rubber layer is not lower than an outer surface of the hard rubber layer;

wherein the hard rubber layer and the soft rubber layer are formed by integral injection molding or press-molding.

* * * * *